No. 892,946. PATENTED JULY 7, 1908.
J. R. DUCKETT.
ANIMAL POKE.
APPLICATION FILED DEC. 3, 1907.

Witnesses:
H. N. Sanderson
M. P. Massey

Inventor:
Jess R. Duckett

UNITED STATES PATENT OFFICE.

JESSE R. DUCKETT, OF BLAINE, MISSISSIPPI.

ANIMAL-POKE.

No. 892,946.　　　　Specification of Letters Patent.　　　Patented July 7, 1908.

Application filed December 3, 1907. Serial No. 404,974.

*To all whom it may concern:*

Be it known that I, JESSE R. DUCKETT, a citizen of the United States, residing at Blaine, in the county of Sunflower and State of Mississippi, have invented a new and useful Animal-Poke, of which the following is a specification.

My invention pertains to animal pokes— i. e., devices designed to be secured on the neck of cattle and horses with a view of preventing such animals from escaping through, under or over fences having wire runners; and it consists in the peculiar and advantageous poke hereinafter described and specifically defined in the claim appended.

Figure 1:
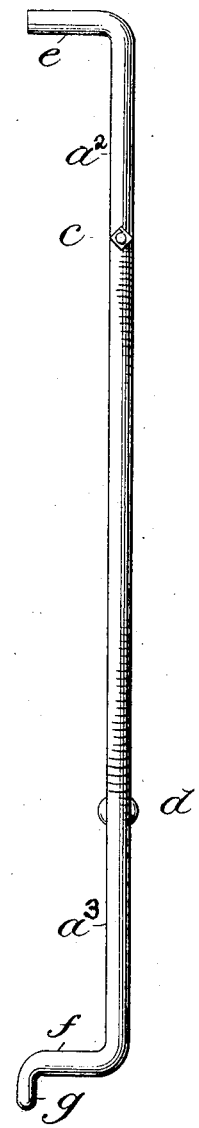
Figure 2:
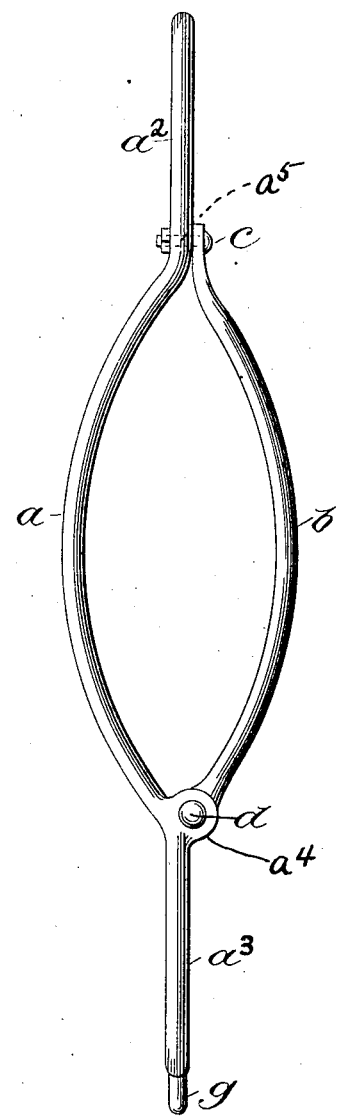

In the drawings, accompanying and forming part of this specification: Figure 1 is a side elevation of my improved animal poke, and: Fig. 2, a rear elevation of the same.

Similar letters designate corresponding parts in both views of the drawing, referring to which:

$a$ is the body or major member of my novel poke. The said body or major member is preferably, though not necessarily, of metal, and comprises an intermediate, outwardly curved portion, an arm $a^2$ reaching upwardly from the upper end of the curved portion and terminating in a forwardly extending angular portion $e$, and an arm $a^3$ depending from the lower end of the curved portion and provided at its lower end with a forwardly-reaching angular portion $f$ which terminates in a short, depending portion $g$ for an important purpose hereinafter set forth. At the lower end of its intermediate, curved portion, the body or major member $a$ is provided with an apertured enlargement $a^4$, and immediately above said intermediate curved portion the body or major member has an aperture $a^5$; the body or major portion being of course made sufficiently large at that point to prevent its being seriously weakened by said aperture $a^5$.

In addition to the body or major member $a$, the poke embodying my invention comprises an outwardly curved member $b$ which is preferably, though not necessarily, of metal. The said member $b$ is connected in a hinged manner and through the medium of a pintle $d$ to the apertured enlargement $a^4$ of member $a$, and its upper end portion is apertured and is designed to be detachably connected to member $a$ by a bolt $c$ extending through the aperture $a^5$ in member $a$.

In the practical use of my novel poke, the same is fastened through the bolt $c$ on a cow's neck, and it will be manifest that in the event of the cow endeavoring to go through, over or under a fence having runners either the upper portion $e$ or the lower portion $f$ of the poke will catch against a runner and in that way cause the cow to desist from its efforts to escape. The depending portion $g$ on the lower, forwardly-reaching portion $f$ serves to prevent the poke catching under roots or vines while the cow is feeding, and is an important feature for that reason.

It will be noted from the foregoing that in addition to being efficient for the purpose stated, my novel poke is simple and inexpensive in construction and is well adapted to withstand exposure to weather and the rough usage to which animal pokes are ordinarily subjected.

Having described my invention, what I claim and desire to secure by Letters Patent of the United States, is—

In an animal poke, the combination with a body or major member comprising an intermediate, outwardly-curved portion, an arm reaching upward from the upper end of said intermediate portion and terminating in a forwardly extending, angular portion, and an arm reaching downward from the lower end of said intermediate portion and terminating in a forwardly extending angular portion having at its forward end a short depending portion; of an outwardly curved member hinged to the first named member at one end of the intermediate curved portion thereof, and means detachably connecting the second named member to the first named member at the opposite end of the intermediate curved portion of the latter.

J. R. DUCKETT.

Witnesses:
L. D. EUBANK,
J. B. HILL.